Sept. 10, 1929.  A. E. JOHNSON  1,728,064
COOKING UTENSIL
Filed Oct. 23, 1928   2 Sheets-Sheet 1
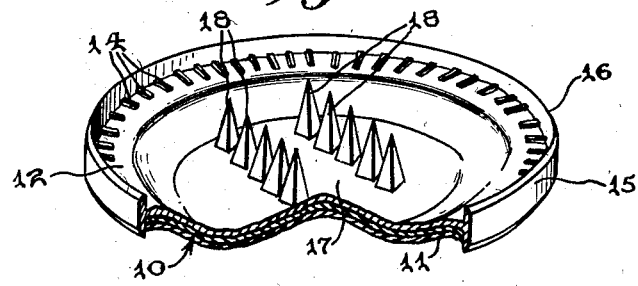
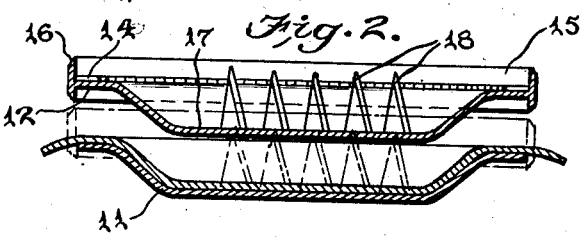
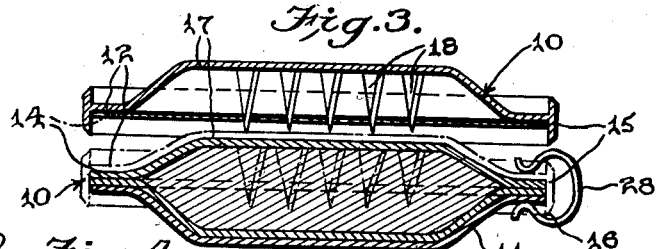
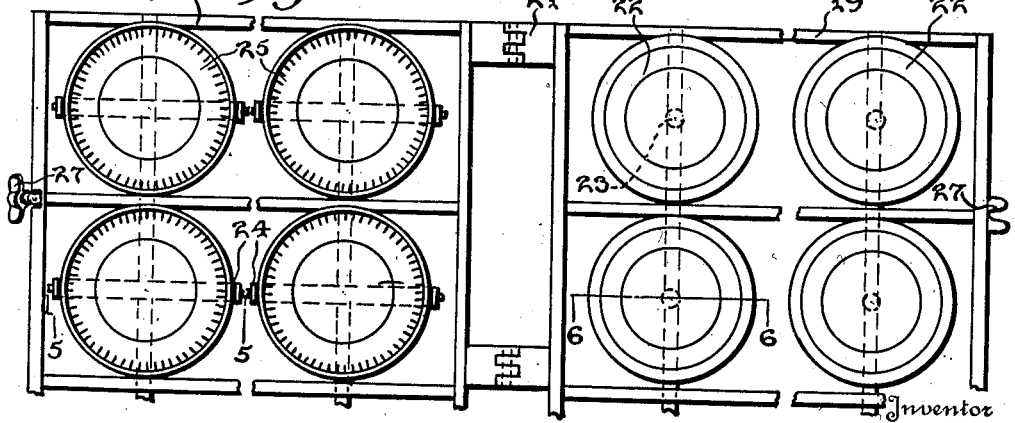
Inventor
Annie E. Johnson,
By
Attorney Sept. 10, 1929.  A. E. JOHNSON  1,728,064
COOKING UTENSIL
Filed Oct. 23, 1928  2 Sheets-Sheet 2
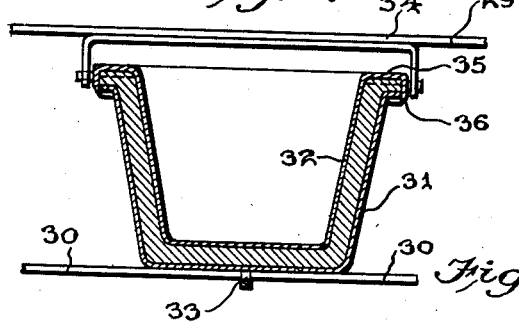
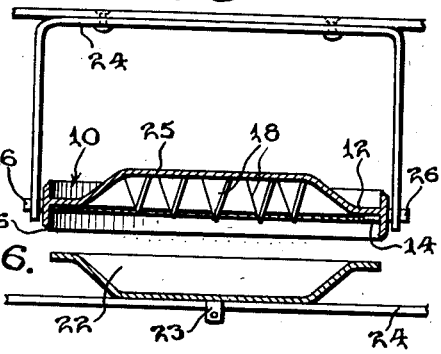
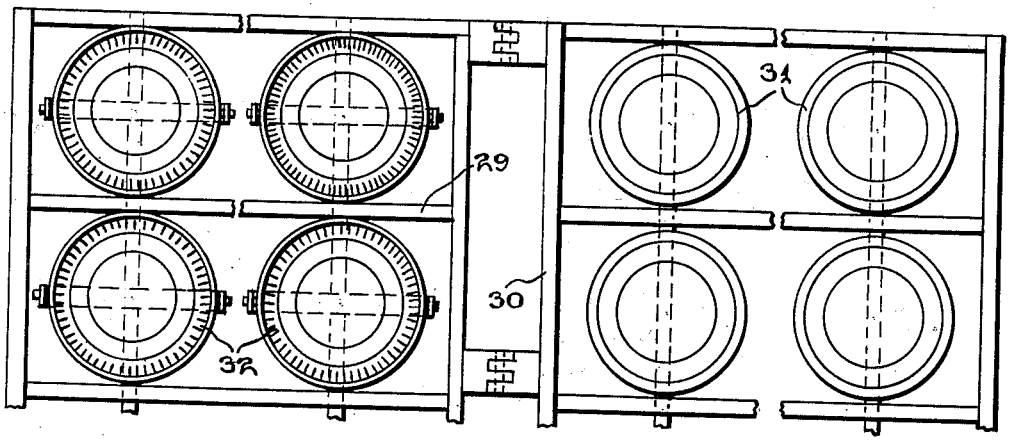
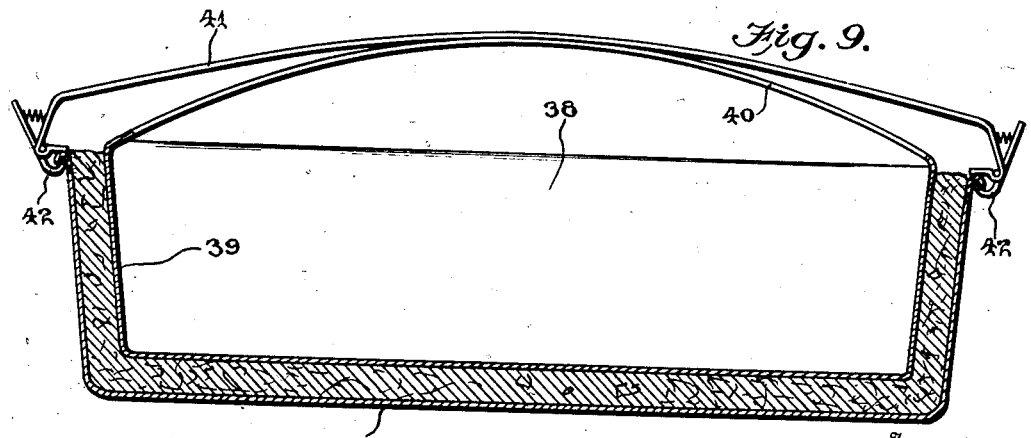
Inventor
Annie E. Johnson,
By
Attorney Patented Sept. 10, 1929.

1,728,064

UNITED STATES PATENT OFFICE.

ANNIE EMMA JOHNSON, OF CLEVELAND, OHIO.

COOKING UTENSIL.

Application filed October 23, 1928. Serial No. 314,361.

The object of the invention is to provide a device adapted to be used in connection with a conventional cooking utensil to serve, with the latter as a mold for the baking of pastry for timbales, tarts, patties, shells for creamed chicken, fish, etc., and cake shells for ice-cream puddings and the like; to provide a device particularly serviceable for use with conventional pie plates to bake the pastry for open pies; to provide a device, which, when used with a pie plate, will sever the extraneous dough and subsequently crimp the peripheral edge of the dough as well as puncture the top crust when the pie to be baked is to have such; and to provide a device which is of simple form and therefore susceptible of cheap manufacture and low marketing cost.

With this object in view, the invention consists in a construction and combination of parts, of which a preferred embodiment is illustrated in the accompanying drawings, wherein:

Figure 1 is a perspective view of one form of the invention partly broken away.

Figure 2 is a diametrical sectional view illustrative, in full lines, of the initial position of the device with the reference to the associated pie plate, and, in dotted lines, its final position preparatory to baking the pastry for an open pie.

Figure 3 is a view similar to Figure 2, but showing the invention as used in preparing for baking a pie having a top crust.

Figure 4 is a plan view of a multiple form of the invention.

Figures 5 and 6 are respectively sectional views on the planes indicated by lines 5—5 and 6—6 of Figure 4.

Figure 7 is a view similar to Figure 4, illustrating the invention as designed for the baking of timbales, tarts, patties and similar forms of pastry shells.

Figure 8 is a sectional view of one of the mold members used for the baking of pastry cups.

Figure 9 is a vertical diametrical sectional view of a form for the baking of cake shells.

Since timbales, tarts, patties, ice-cream puddings and the like each requires its special shape of pastry, the invention when used for these different shapes must be constructed to accord therewith. In the form for pies the invention consists of a laminated disk element 10 of the general form of the pie plate 11, so as to be adapted to nest in the latter. The flange 12 of the disk element is crimped as indicated at 14 so as to be peripherally provided with a circular series of radial ribs raised above either the top or bottom faces. The flange is peripherally bounded with an integral annular knife or dough trimmer 15, the top and bottom edges of which are bevelled as indicated at 16 to provide shearing edges. In the center of the depressed portion 17 there are formed a plurality of spurs 18, the function of which hereinafter appears.

In the baking of pastry for open pies, the dough is rolled in the usual form and placed in the pan 11, as indicated in Figure 2. The disk element is then seated in the pan on top of the dough, this seating operation passing one of the shearing edges 16 down past the peripheral edge of the pie plate flange thus severing the extraneous portion of the dough and the ribs 14 forming depressions in the dough, such as is usually formed by the cook by means of a fork. The disk and plate together form a mold for the dough and maintain its shape according to the pie plate during the baking operation, the disk being left in the plate and on top of the dough during such operation. When the dough shall have been cooked, the disk then may be removed and there is left in the plate a perfect pastry form for the reception of the filling.

In the baking of pies having a top crust, the dough to form the bottom crust is placed in the pan in the usual manner with the filling placed on top. The dough to form the top crust is then placed over the filling and the finishing operation preparatory to baking carried out.

As shown in Figure 3, the dough for forming both the upper and lower crusts projects beyond the edge of the plate and the finishing operation preparatory to baking consists in inverting the disk 10 and bringing it down on the top layer of dough until the flange 12 contacts with the same. This will of course be attended with a trimming or shearing of the projecting edges of the layers of dough and the crimping of the peripheral edge of the top layer by the ribs 14. In this inverted position, the top layer will be punctured by the spurs 18 to provide the desired perforation for the escape of steam generated in baking, during which the disk remains attached.

In Figures 4 to 6 inclusive, there is illustrated that form of the invention which provides for the simultaneous baking in quantities of the desired product. In the multiple form, which may consist of as many units as are practicable, there is provided a holder consisting of the plate frame 19 and disk frame 20, the two being hingedly connected as indicated at 21, so that the disk frame may be folded down on the plate frame. The plates 22 are carried by the plate frame and to insure their having always the correct positions in the frame, they are provided with the center studs 23 engageable in sockets formed in the plate frame. In the disk frame, there are mounted the yokes 24 each yoke supporting a former disk 25 identical in all respects with that illustrated in Figure 1, the former disk having pivotal connections 26 at diametrically opposite points with the pendent arms of the yokes. The particular manner of mounting in the yokes provides for the ready inversion of the disk, so as to dispose them in either position desired.

The yokes are positioned on their frame according to the positioning of the plates on their frame and when the two frames are brought together by the folding of the disk frame down on the plate frame, the disks are positioned in the plates for the baking of pastry for open pies, or for the finishing operation on the pastry for covered pies.

The plate and disk frames are provided with co-operating latch members 27 at the edges remote from the hinges 21, so that in the baking of open pie pastry, the disks may be held in close contact with the dough contained in the plates. Likewise, in unit baking, the disk is provided with clamping members 28 engageable with the under face of the pie plate flange to maintain disk member in contact with the plate contents during baking.

In Figure 7, there is shown a form of the invention designed for the multiple baking of pastry cups such as are used for timbales, tarts, patties, shells for creamed chicken, fish, and the like. The general arrangement of this form is the same as for multiple pie baking, consisting of the hingedly connected frames 29 and 30 of which the latter carry the outer mold members 31 and the former the inner mold members 32, the outer mold members being in the form of cups of a size to define the outer dimensions of the pastry cup to be baked, and the inner mold members the interior of pastry cups or shells.

The outer mold members are mounted on their frame by means of studs 33 seating in eyes formed in the frame and the inner mold members are carried by yokes 34 secured to their frame 29. The inner mold member is provided with a lateral flange 35 which is bounded by a pendent flange 36, the free edge of which is beveled to provide an annular knife to sever the extraneous dough, when the inner mold members are seated in the outer mold members.

In Figure 9 that form of the invention designed for the baking of pastry for the reception of a filler such as fruit or ice cream, is shown. This form of the invention consists of a pan 37 and an inner frame member 38, the latter having a peripheral flange 39 spaced from the side wall of the pan 37 when the former member is positioned therein. The former member is spanned diametrically with a yoke 40 connected for a substantial part of its length with a yoke 41, the latter being in diametrically spanning relation with the pan 37 to which it is detachably connected by means of the latch members 42. In the use of this form of the invention the dough is placed in a pan and the former 38 properly positioned therein by the attachment of the latch members 42. When the device is placed in the oven, the dough rises between the side wall of the pan and the flange of the former and when the shell has been fully formed, the former member is removed by the detachment of the latches 42. The pan may then be replaced in the oven for the browning of the baked shell, and when this is completed the shell is ready for the reception of the filling, whatever it may be.

The invention having been described, what is claimed as new and useful is:

A device of the kind indicated consisting of a disk of the general form of a pie plate and adapted to nest in the latter, said disk having a flange simulating the pie plate flange, an annular knife peripherally surrounding said flange, the disk being provided with a plurality of spurs projecting in the direction of the cutting edge of the knife.

In testimony whereof she affixes her signature.

ANNIE EMMA JOHNSON.